S. NEWELL.
CULTIVATOR BEAM SUPPORT.
APPLICATION FILED JULY 12, 1915.
1,332,994. Patented Mar. 9, 1920.
*Fig. 1.*
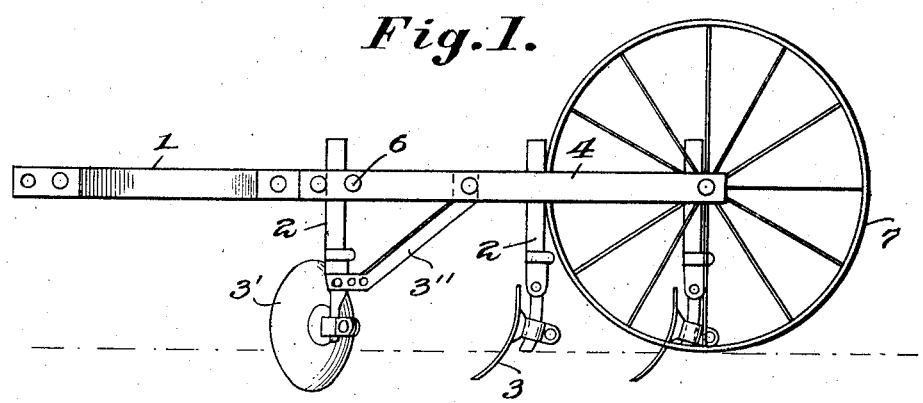
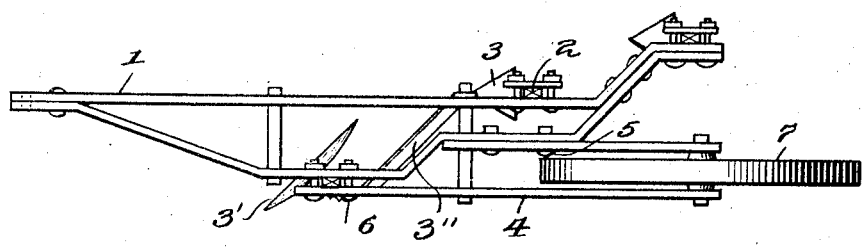
*Fig. 2.*
*Fig. 4.*
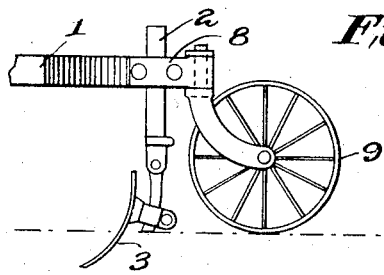
*Fig. 3.*
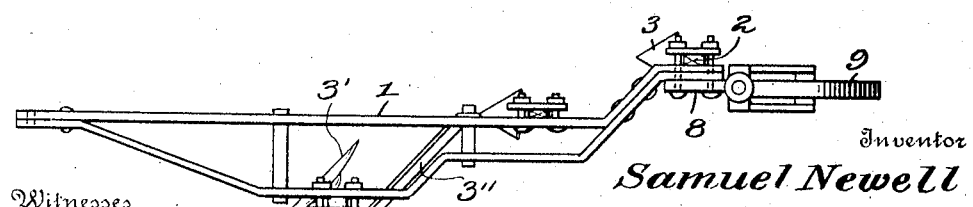
Inventor
Samuel Newell
Witnesses
H. H. Lybrand
L. Wilcox
By Victor J. Evans
Attorney

UNITED STATES PATENT OFFICE.

SAMUEL NEWELL, OF EDDYVILLE, IOWA.

CULTIVATOR-BEAM SUPPORT.

1,332,994.  Specification of Letters Patent.  Patented Mar. 9, 1920.

Application filed July 12, 1915. Serial No. 39,512.

*To all whom it may concern:*

Be it known that I, SAMUEL NEWELL, a citizen of the United States, residing at Eddyville, in the county of Wapello and State of Iowa, have invented new and useful Improvements in Cultivator-Beam Supports, of which the following is a specification.

This invention relates to supports for cultivator beams and consists in the novel features hereinafter described and claimed.

An object of the invention is to provide a disk attachment for a cultivator beam and a wheel attachment for the same, said wheel attachment coöperating with the beam in a manner to regulate the depth at which the disk will operate in the soil. Heretofore it has been the practice when disks are applied to cultivator beams to connect the beams together by what is generally known as a bedding bar. Such a bar has been necessary to equalize or neutralize the strain from the disks to prevent side draft, for the disks on the adjacent beams have their concaved sides disposed substantially in opposite directions and unless there is some connecting means between the beams, both of the beams will tend to swing or move in inward directions as the disks operate in the soil.

The said bedding bar or its equivalent is objectionable for the reason that it prevents or limits the independent movement of the beams to which it is attached and consequently the beams cannot be moved readily to cause the soil engaging elements to work in the soil and dodge or move in between the plants which are standing in an uneven row.

With the present invention each cultivator beam may be moved independently of the other and at the same time the arrangement is such as to eliminate or prevent side draft notwithstanding the fact that each beam carries a soil engaging disk.

In the accompanying drawing:—

Figure 1 is a side elevation of the cultivator beam with the support applied;

Fig. 2 is a top plan view of the same;

Fig. 3 is a top plan view showing a modified form of support applied to the beam;

Fig. 4 is a side elevation of the form of support shown in Fig. 3.

As illustrated in the accompanying drawing, the beam 1 is of usual pattern such as is generally employed upon a cultivator and may be pivotally connected with the frame of the cultivator in the usual manner by any suitable connecting means (not shown). The beam 1 carries standards 2. Shovels 3 are carried by the rear standards 2. A disk 3' is journaled on the forward standards 2 and a brace 3'' is interposed between the lower portion of the forward standards 2 and the intermediate portion of the beam 1. A frame 4 is attached to the side of the beam 1 by means of bolts 5 and bolts 6, the last mentioned bolts also serving as means for holding the forward standard 2 in position upon the beam 1. The bolts 5 and 6 respectively pass through opposite sides of the frame 4 and a wheel 7 is journaled between the rear portions of the sides of the frame 4. The center of the wheel 7 is in horizontal alinement with the median longitudinal dimension of the beam 1 consequently approximately half of the wheel 7 is above the said beam and approximately half of the said wheel is below the said beam. The wheel 7 is adapted to travel upon the surface of the soil and the soil engaging elements project below the lower side of the wheel. Consequently as the beam 1 is moved over the soil the elements 3 and 3' enter the same and cultivate or stir the soil while the wheel 7 travels along the surface thereof and governs the depth at which the said soil engaging elements enter the same. When the frame 4 is applied to the beam 1 the usual stirrups employed for moving the beam in and out to dodge standing plants may be used and the wheel 7 supports the rear portion of the beam 1 and also holds the beam against side movement due to the side strain applied to the disk 3' while operating in the soil.

In the form of the invention as shown in Figs. 3 and 4 of the drawing, the bracket 8 is attached to the side of the rear portion of the beam 1 and a wheel 9 is castered in the said bracket and is adapted to travel along the surface of the soil. The said wheel 9 supports the rear portion of the beam 1 and serves as means for holding the beam against side movement.

From the foregoing description taken in conjunction with the accompanying drawing, it will be seen that a cultivator beam of simple and durable structure is provided and that the same may be used whereby the beams may be readily swung with relation to each other. The form of beam and attachment as shown in Figs. 1 and 2 is adapted to be attached to the frame of a cultivator having pivoted supporting wheels and the beams are guided by turning the supporting wheels on their pivots.

Having described the invention what I claim is:—

A cultivator beam having opposite spaced side portions fixedly connected together at their ends and also at intermediate points in their length, whereby the beam is at once light, stiff, and strong, a standard attached to one side portion of the beam, a soil engaging element in the form of a disk journaled on said standard and disposed in part in the same vertical plane as the space between the side portions of the beam, a diagonal brace interposed between and connected with the lower portion of the standard and the side portion of the beam remote from said standard, other soil engaging elements carried by the beam at points behind the standard and in longitudinal vertical planes parallel to that of the disk, and a wheel attached to the rear portion of the beam and arranged to travel in a path between that of the rearmost soil engaging element and that of the outermost portion of the disk and serving as a support for the rear portion of the beam.

SAMUEL NEWELL.

Witnesses:
LILLIAN CARSON NEWELL,
D. W. WARD.